Sept. 23, 1969  H. SPODIG  3,468,406
CONVEYOR ARRANGEMENT
Filed May 11, 1967  6 Sheets-Sheet 1

INVENTOR.
Heinrich Spodig
By Michael S. Striker
Attorney

Sept. 23, 1969        H. SPODIG        3,468,406

CONVEYOR ARRANGEMENT

Filed May 11, 1967        6 Sheets-Sheet 4

INVENTOR:

Sept. 23, 1969  H. SPODIG  3,468,406
CONVEYOR ARRANGEMENT

Filed May 11, 1967  6 Sheets-Sheet

INVENTOR:

INVENTOR:

United States Patent Office 3,468,406
Patented Sept. 23, 1969

3,468,406
CONVEYOR ARRANGEMENT
Heinrich Spodig, 84 Netteberge, 4711 Bork, Germany
Filed May 11, 1967, Ser. No. 637,695
Claims priority, application Germany, May 13, 1966,
S 103,786
Int. Cl. B65g 47/22, 13/02, 17/46
U.S. Cl. 198—41      9 Claims

ABSTRACT OF THE DISCLOSURE

A conveyor constructed for the purpose of conveying ferromagnetic material. A series of rollers are mounted across the width of the conveyor, and along the path travelled by the ferromagnetic material to be conveyed. The rollers mounted in axles extending across the conveyor are separated by an air gap. Mounted within these gaps and interposed between the rollers are magnetic sources which combine to produce a magnetic field. The magnetic field acts upon the ferromagnetic material being conveyed, and causes the latter to bear firmly against the rollers of the conveyor. The construction of the rollers and the arrangement of the magnetic sources may be accomplished in a variety of embodiments to realize the desired results.

Background of the invention

The present invention is adapted to convey boxes, containers or material parts made of ferromagnetic materials. The rollers of the conveyor are operated so that conveying of the material is accomplished by exerting a force which maintains the conveyed material firmly against the conveyor surface. Thus, the conveyor is particularly adaptable for the conveying of materials across spaces in which the material would ordinarily drop or fall from the conventional type of conveyors.

The present invention relies basically for its operation upon the condition that a plurality of permanent magnets are situated between the rotatable rollers along the conveyor path. The permanent magnets then produce a distributed magnetic field which acts upon the materials to be conveyed. This magnetic force field may be applied to counteract any tendency for the material to be conveyed, to fall from the conveyor as a result of gravity. Thus, the present invention may be adapted to the condition wherein the conveyor is arranged so that the materials to be conveyed are suspended from beneath the conveyor, rather than being supported on top of the conveyor. The magnetic field will, in such an arrangement serve to maintain the materials being conveyed against the conveyor, and prevent them from dropping off as a result of gravity effects. The materials to be conveyed in this arrangement, therefore, do not lie on top of the rollers, but are suspended from beneath and are attracted to the rollers through the magnetic effect. The materials to be conveyed are moved along the path of the conveyor due to the rotational action of the rollers. The present invention, therefore, provides for an entirely new application of conveyors.

Magnetic transport systems are conventionally known in the art. In such conventional systems however, the rollers contain a built-in magnetic system in which the rollers are made of ferromagnetic material. At their periphery the rollers are partially magnetized in these conventional arrangements. The functional operation of the commonly known conveyor systems depends directly upon a magnetic coupling between the driving rollers and the materials being conveyed along by the conveyor. In contrast, to the conventional arrangements the rollers, in accordance with present invention, are made of nonmagnetic material, and do not have any direct magnetic coupling with the material being conveyed. The principle advantage of the present invention, therefore, is that it includes a magnetic system which is independent of the construction of the conveyor and has no other requirements other than the spaces between the rollers of the conveyor

Summary of the invention

A conveyor arrangement employing magnetic effects. A plurality of rollers are mounted across the width of the conveyor to form a roller conveyor. Sufficient space is provided between the rollers to permit the location of permanent magnets. The magnets are arranged so that adjacent magnets are of opposite polarity and that the combined effect of the poles of the individual magnets operates in the rotary direction of the rollers. The rollers are mounted in series along the path of the conveyor. The magnetic system may be produced in a variety of ways through construction of different embodiments.

In one embodiment the permanent magnets may be secured to the frame of the conveyor and form a magnetic path therewith. In other embodiments the permanent magnets may be magnetically isolated from the frame of the conveyor. The individual pole pieces of the magnets between the rollers may, furthermore, be oriented in different relationships so as to produce fields of different intensity and different configurations.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Description of the preferred embodiments

Figure 1:
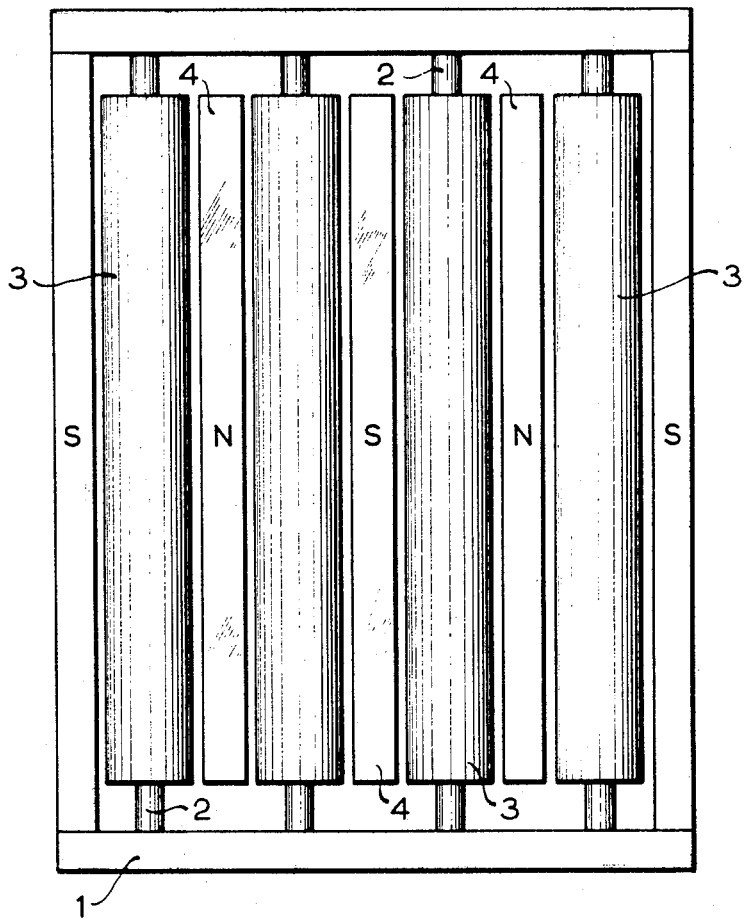
FIG. 1 is a plan view of a conveyor arrangement in which rollers are mounted along the width of the conveyor and a plurality of individual magnetic pole pieces are mounted within the spaces of the rollers.
Figure 2:
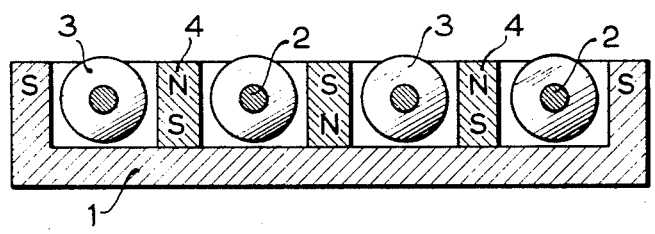
FIG. 2 is a cross sectional view of the conveyor arrangement of FIG. 1.

Referring to the drawing, and in particular to FIG. 1, the roller conveyor includes a three-sided box-type unit 1. Mounted within opposite sides of the box frame 1, are the axles 2 of the rollers 3. The rollers 3 are rotatable about the axles 2, in the commonly known manner, and are operated with a driving means, not shown. Within the space prevailing between the rollers 3 are magnets 4 secured to the base of the frame 1. The magnets 4 are arranged so that they are situated of opposite polarity in a sequential manner. The frame 1 is constructed of ferromagnetic material, and forms thereby a magnetic path for linking the magnetic poles of the magnets 4 in contact with the base. The extreme side walls of frame 1 result in magnetic poles which correspond, in sequence, to the adjacent poles at the upper conveying plane of the conveyor. As a result of this arrangement the magnetic field is uniformly distributed throughout the conveyor path, and extends along the rotary directions of the rollers 3.

The top surfaces of the magnets 4 lie somewhat beneath the conveying plane determined by the top surfaces of the rollers 3. As a result, a direct magnetic force connection is not established with the ferromagnetic material that may be conveyed by the conveyor, through the rollers 3. The magnetic effect, produced by the magnets 4 does, however, attract the ferromagnetic material being conveyed and causes it to bear against the rollers 3. In view of this arrangement therefore it is possible to transport the material, on a conveyor along an inclined plane, and again against the force of gravity. The magnetic arrangement, in acordance with the present invention, also permits the ferromagnetic material to be conveyed along by the conveyor in a hanging manner. Thus, the conveyor may be operated in a reversed manner wherein the base of the conveyor is at the top and the conveying plane faces downward, in the direction of gravity. The ferromagnetic material can then be suspended from beneath the conveyor through the magnetic attraction generated by the field of the magnets 4. The magnets 4 produce a combined effect so that while the ferromagnetic material is prevented from falling down from the conveyor, it is transported along the conveyor path by the rollers 3.

Figure 3:
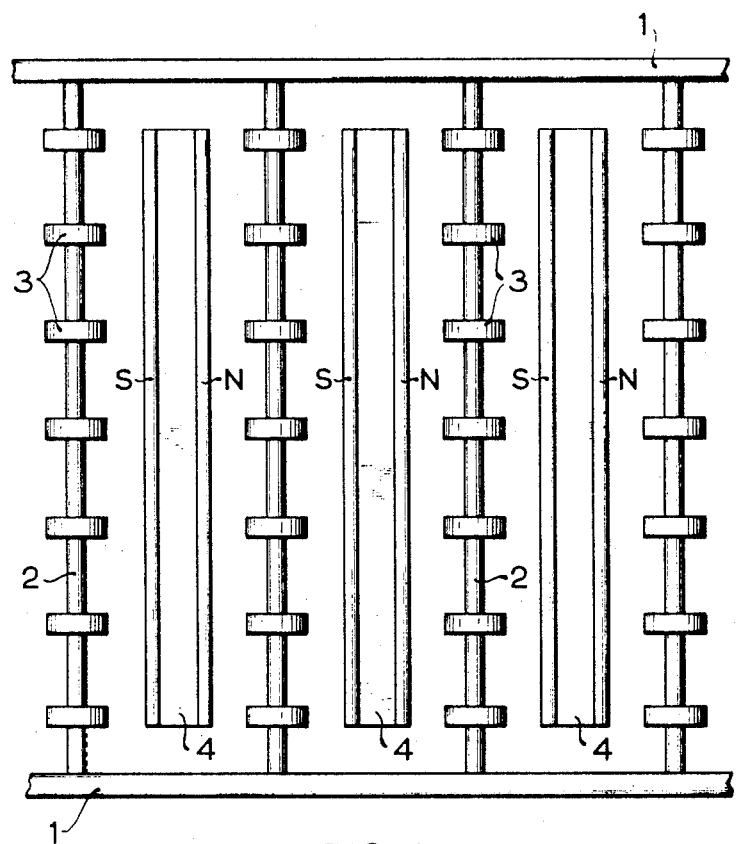
FIG. 3 is a plan view of a conveyor arrangement in which the rollers of the conveyor are of narrow design and mounted on axles along the width of the conveyor.
Figure 4:
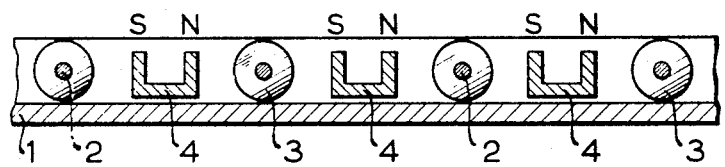
FIG. 4 is a cross sectional view of the embodiment of FIG. 3.

In the embodiment of FIGS. 3 and 4, the rollers 3 are in the form of substantially narrow units. A plurality of these narrower rollers 3 is distributed along the axles 2. The magnetic sources 4 are, in this embodiment, also situated within the space between the rollers, but are not magnetically linked to the frame 1. Each of the magnetic sources 4 has a U-shaped cross section so that one leg of the U is a north pole and the other leg of the U is a south pole. Similarly to the preceding embodiment, this arrangement also produces a uniform distribution of the magnetic field in the rotary direction of the rollers. Thus, adjacent poles of the magnetic sources, which are separated by the axles 2, are of opposite polarity.

Figure 5:
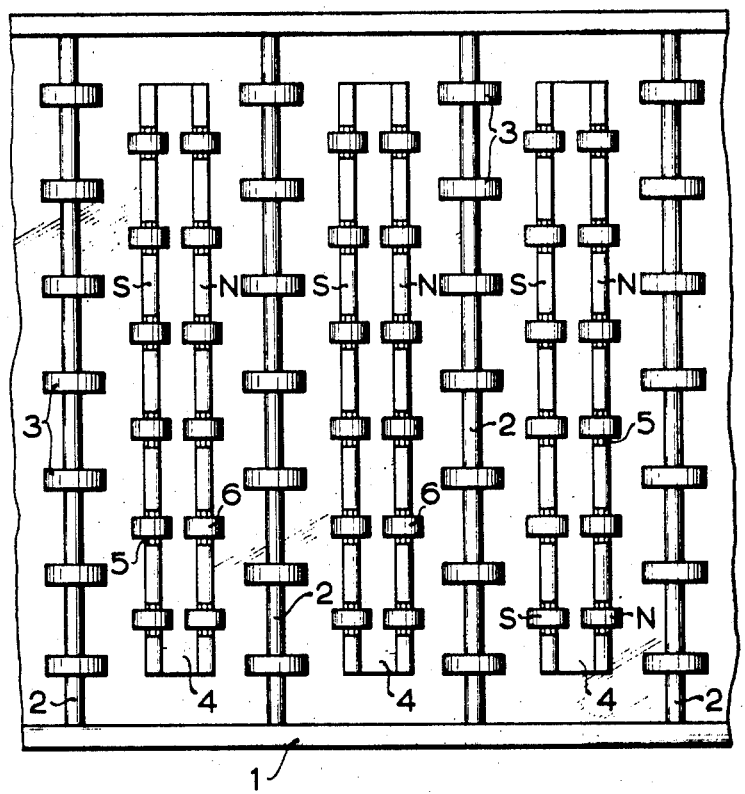
FIG. 5 is a plan view of the roller conveyor in which the rollers are of narrow design and U-shaped magnets are mounted between the axles carrying the rollers, with the provision that smaller auxiliary rollers are mounted on the legs of the U-shaped magnets.
Figure 6:
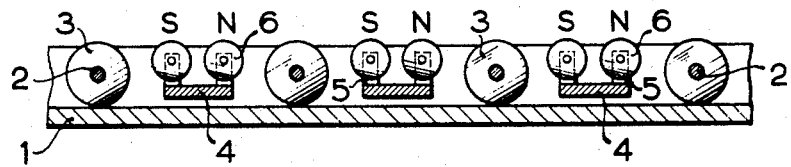
FIG. 6 is a cross sectional view of the arrangement of FIG. 5.
Figure 7:
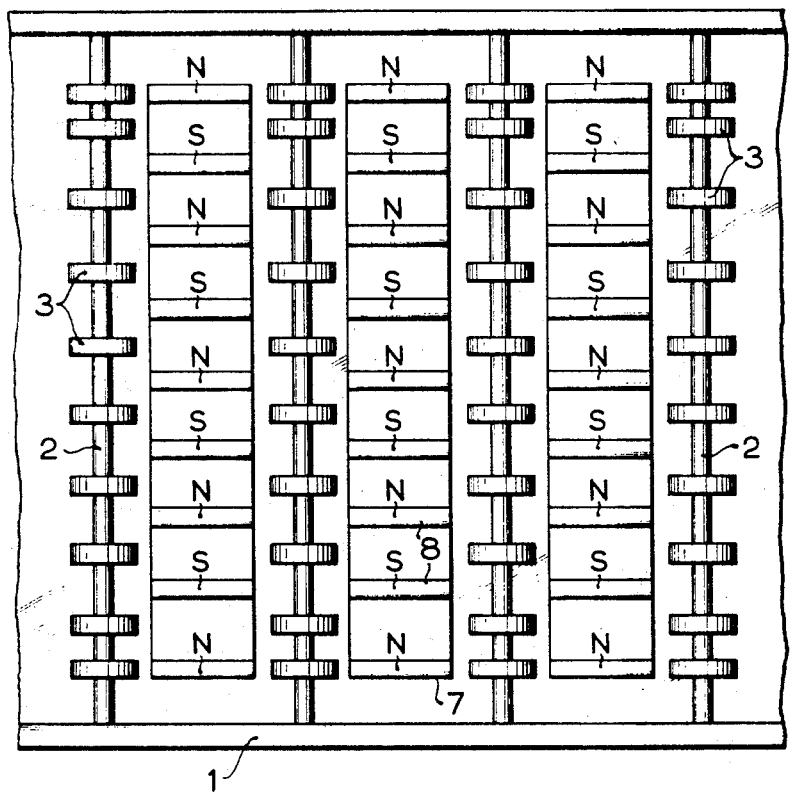
FIG. 7 is a roller conveyor arrangement in which the rollers are of narrower design and magnetic pole pieces oriented lengthwise along the path of the conveyor, are mounted upon a common connecting plate.
Figure 8:
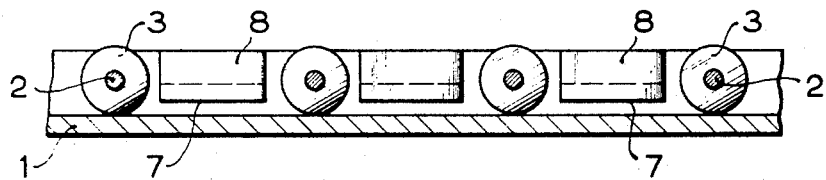
FIG. 8 is a cross sectional view of the arrangement of FIG. 7.

The embodiment shown in FIGS. 5 and 6 is similar to the construction of the preceding embodiment. The basic difference between the two embodiments resides in the arrangement wherein smaller rollers 6 are mounted upon the legs of the U-shaped magnetic sources 4. These rollers 6 are of smaller diameter than those of rollers 3, and are distributed along the width of the conveyor. The rollers are mounted so that they are freely rotatable upon the legs of the U-shaped magnetic sources 4 and are arranged so that a plurality of the rollers 6 may be mounted along each leg extending the width of the conveyor. Each roller 6 may be interleaved between the rollers 3. The rollers 6 serve to bridge the space between adjacent rollers 3, and thereby shorten the effective gap between the rollers 3. In the embodiment of FIGS. 7 and 8, an arrangement is shown in which the magnetic sources consist of a plurality of individual magnets 8 secured to a connecting base 7. Neither the individual magnets nor the connecting base 7 are magnetically linked to the frame 1. Support of the structures comprising the individual magnets 8 and connecting base 7 may be derived in any one of numerous ways. Thus, a magnetic shield may be provided beneath the base 7 and the combination may then be secured, if desired to the frame 1. In this manner the magnetic structure is supported, and at the same time, magnetically isolated from the frame. This same reasoning is also applicable to the construction of the embodiments shown in FIGS. 3 and 4 as well as in FIGS. 5 and 6. The individual magnets, in FIGS. 7 and 8, are situated so that they are sequentially of opposite polarity. The individual magnets 8 extend along the width of the connecting plate or base 7 which, in turn, is situated along the width of the conveyor and parallel to the axles 2. The resulting magnetic field, is therefore, generated across the path of the conveyor, in contrast to the longitudinal direction of the conveyor. Through the construction of FIGS. 7 and 8 the magnetic poles may be located closer together, and thereby a stronger magnetic field may be generated.

Figure 9:
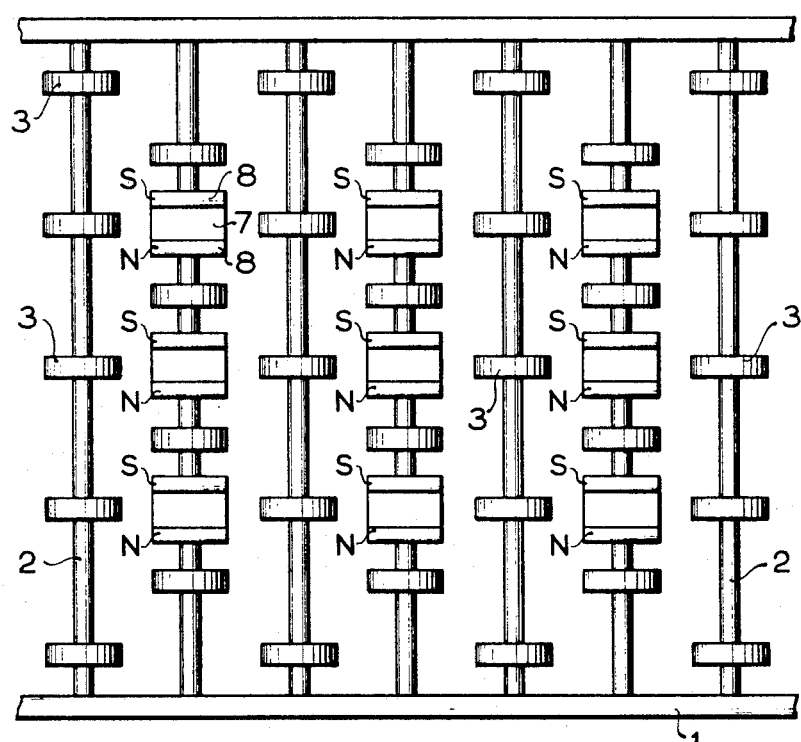
FIG. 9 is an embodiment of a roller conveyor in which the rollers of narrow design and magnetic pole pieces are mounted on a plurality of connecting plates which are in turn mounted on the axles of the rollers.
Figure 10:
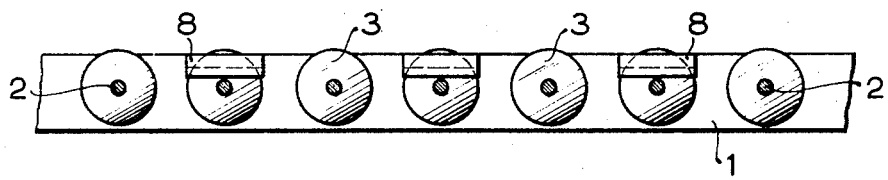
FIG. 10 is a cross sectional view of the arrangement of FIG. 5

FIGS. 9 and 10 show a configuration in which the individual magnets 8 are mounted upon a connecting base or plate 7 which is, in turn, secured to the axles 2. Thus, the individual magnetic sources are separately constructed from individual magnets 8 and separate bases or plates 7. These individual magnetic sources are then mounted directly upon the axles 2 and between the rollers 3. The arrangement may further be extended by mounting the individual magnetic sources upon the axles, but in any one of the other ways illustrated by the preceding embodiments. Thus the longitudinal walls of the magnetic poles 8 may, for example, be made to extend along the width of the conveyor rather than its length, as shown in FIG. 9. This configuration may be obtained by simply rotating the assembled unit of parts 7 and 8 upon the axle 2, through an angle of 90 degrees.

Figure 11:
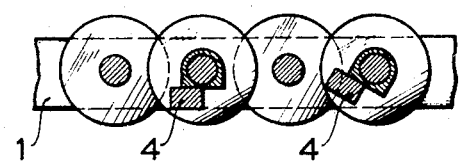
FIG. 11 is an elevational cross sectional view of a roller conveyor arrangement, in which magnetic sources are mounted upon rotatable shafts carrying rollers of relatively narrow width, the magnetic sources being mounted on the axles between the rollers.
Figure 12:
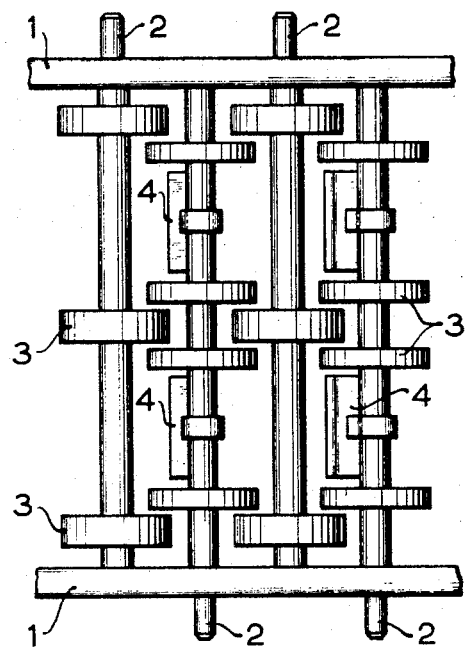
FIG. 12 is a plan view of the embodiment of FIG. 11.

In a further embodiment shown in FIGS. 11 and 12, the magnetic sources are mounted directly upon the axles 2, and these are rotatably mounted within the frame 1. FIG. 11 illustrates the condition when the pole faces of one set of magnetic sources lie parallel to the plane of conveyance, while another set of pole faces, mounted on another axle, are inclined to the plane of conveyance. In this particular arrangement the magnetic field is no longer uniformly distributed and fully effective. Thus this arrangement does not lend itself well to the state of operation, when the material to be conveyed is suspended from beneath the conveyor. In this case, the material to be conveyed may easily drop from the conveyor when the pole faces are rotated away from the plane of conveyance. At the same time, it will be understood that the axles 2 may be rotated simultaneously in a predetermined manner so that the magnetic sources, mounted on the axles 2, rotate relative to each other in a desired pattern or configuration. An arrangement may then be had, such that by rotating a plurality of the axles 2 the material being conveyed, drops off the conveyor by itself, and collects or stacks itself at a particular location with respect to the conveyor. The stacking feature is particularly desirable when sheet material is being transported by the conveyor.

A decrease in the effect of the magnetic field upon the material to be conveyed may also be realized without relying upon the rotational effect of the axles 2. Thus, magnetic sources may be secured to the frame 1 and through a mechanical linkage arrangement. These magnetic sources may be moved in a direction away from the plane of conveyance. As a result of this motion of the magnetic sources from the plane of conveyance, the magnetic effect upon the material being conveyed is reduced due to the enlargement of the gap between the magnetic sources and the material being conveyed. Consequently, the strength of the magnetic field may be severly reduced, allowing thereby the material being conveyed to drop off the conveyor surface, in a similar manner described with respect to FIGS. 11 and 12.

The magnetic poles in FIGS. 11 and 12 may, of course, also be provided with recesses 5 and rollers 6 similar to the construction shown in FIGS. 5 and 6. Thus, the recesses 5 and rollers 6 may be distributed along the pole pieces of the magnetic sources 4, in a sequential manner.

It will be understood that each of the elements described above, or two or more together, may also find a useful application in other types of roller conveyors differing from the types described above.

While the invention has been illustrated and described as embodied in roller conveyors, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A conveyor arrangement for conveying magnetizable means along a predetermined path comprising, in combination, a supporting member extending along the conveyor and in a predetermined direction thereof coincident with said path; a plurality of axle members mounted on said supporting member in spaced relationship from each other and transversely to said path; roller members mounted on alternate ones of said axle members for supporting and conveying said magnetizable means; and magnetic means mounted on axle members between said roller members and providing a magnetic field acting upon said magnetizable means for retaining said magnetizable means in contact with said roller members when said axle members supporting said magnetic means are rotated so that said magnetic means is at minimum distance from said magnetizable means, said magnetic means being movable away from said magnetizable means through rotation of said axle members upon which said magnetic means is mounted, whereby said magnetic field acting upon said magnetizable means applies insufficient force to said magnetizable means to retain the latter in contact with said roller members when said magnetic means is moved to maximum distance from said magnetizable means.

2. The conveyor arrangement as defined in claim 1, wherein said magnetic means are a plurality of permanent magnetic members.

3. The conveyor arrangement as defined in claim 2, wherein adjacent pole faces of said magnetic members are of opposite polarity, said pole faces being adjacent to said magnetizable means and facing the same.

4. The conveyor arrangement as defined in claim 2, wherein said supporting member is of ferromagnetic material and one pole of each of said magnetic members is secured to said supporting member.

5. The conveyor arrangement as defined in claim 2, including an interconnecting member upon which said magnetic members are mounted and through which a magnetic path linking said magnetic members prevails.

6. The conveyor arrangement as defined in claim 2, wherein said magnetic members comprise a plurality of U-shaped magnets.

7. The conveyor arrangement as defined in claim 2, including means for magnetically isolating said magnetic members from said supporting member.

8. A conveyor arrangement for conveying magnetizable means along a predetermined path comprising, in combination, a supporting member extending along the veyor and in a predetermined direction thereof coincident with said path; a plurality of axle members mounted on said supporting member is spaced relationship from each other and transversely to said path; roller members mounted on said axle members for supporting and conveying said magnetizable means; magnetic means mounted between said roller members and providing a magnetic field acting upon said magnetizable means for retaining said magnetizable means in contact with said roller members, said magnetic means being a plurality of permanent magnetic members; and secondary roller members mounted adjacent to the pole faces of said magnetic members, said secondary roller members being of non-magnetic material.

9. A conveyor arrangement for conveying magnetizable means along a predetermined path comprising, in combination, a supporting member extending along the conveyor and in a predetermined direction thereof coincident with said path; a plurality of axle members mounted on said supporting member in spaced relationship from each other and transversely to said path; roller members mounted on alternate ones of said axle members for supporting and conveying said magnetizable means; and magnetic means rotatably mounted on axle members between said alternate one of said axle members and providing a variable magnetic field acting varyingly upon said magnetizable means for varying the intensity of the magnetic force applied to said magnetizable means by said magnetic means and thereby vary the intensity of the pressure between said roller members and said magnetizable means to release said magnetizable means from said roller members when said magnetic force and said pressure intensity is minimum, and to hold said magnetizable means securely against said roller members when said magnetic force and pressure intensity is maximum.

References Cited

UNITED STATES PATENTS

| 2,228,913 | 1/1941 | Martin | 271—74.1 |
| 3,051,479 | 9/1962 | Gore | 271—74.1 |

FOREIGN PATENTS

| 17,712 | 7/1912 | Great Britain. |
| 1,824,288 | 9/1960 | Germany. |

RICHARD E. AEGERTER, Primary Examiner